(12) United States Patent
Yuan (10) Patent No.: US 12,463,436 B2
(45) Date of Patent: Nov. 4, 2025

(54) POWER DISTRIBUTION SYSTEM

(71) Applicant: HEFEI YITONG ELECTRONIC TECHNOLOGY CO., LTD, Anhui (CN)

(72) Inventor: Tinghua Yuan, Anhui (CN)

(73) Assignee: HEFEI YITONG ELECTRONIC TECHNOLOGY CO., LTD, Anhui (CN)

( * ) Notice: Subject to any disclaimer, the term of this patent is extended or adjusted under 35 U.S.C. 154(b) by 85 days.

(21) Appl. No.: 18/284,293

(22) PCT Filed: Mar. 15, 2022

(86) PCT No.: PCT/CN2022/080938
§ 371 (c)(1),
(2) Date: Dec. 8, 2023

(87) PCT Pub. No.: WO2022/206372
PCT Pub. Date: Oct. 6, 2022

(65) Prior Publication Data
US 2024/0154434 A1    May 9, 2024

(30) Foreign Application Priority Data
Apr. 1, 2021    (CN) .......................... 202110356005.8

(51) Int. Cl.
*H02J 7/00*    (2006.01)
*B60R 16/023*    (2006.01)
*B60R 16/033*    (2006.01)

(52) U.S. Cl.
CPC ........ *H02J 7/0029* (2013.01); *B60R 16/0238* (2013.01); *H02J 7/0063* (2013.01); *B60R 16/033* (2013.01)

(58) Field of Classification Search
CPC ... H02J 7/0029; H02J 7/0063; B60R 16/0238; B60R 16/033
See application file for complete search history.

(56) References Cited

U.S. PATENT DOCUMENTS

2019/0366952 A1* 12/2019 Ikegaya ............... H02H 1/0061
2020/0233441 A1*  7/2020 Morimoto ............ B60L 3/0076

FOREIGN PATENT DOCUMENTS

| CN | 204623369 | 9/2015 |
| CN | 109017626 | 12/2018 |

(Continued)

OTHER PUBLICATIONS

"International Search Report (Form PCT/ISA/210) of PCT/CN2022/080938", mailed on May 13, 2022, with English translation thereof, pp. 1-4.

(Continued)

*Primary Examiner* — Carlos Amaya
(74) *Attorney, Agent, or Firm* — JCIPRNET (57) ABSTRACT

The invention discloses a power distribution system, including a system power supply, a main control unit, a power line and a number of subsidiary control units. The main control unit comprises a main controller and a main power circuit protection device connected to the main controller. The input end of the main power circuit protection device is connected to the power output end of the system power supply, and the output end of the main power circuit protection device is connected to an end of the power line. Each subsidiary control unit comprises a subsidiary controller and a subsidiary power circuit protection device connected to the subsidiary controller. The input end of the subsidiary power circuit protection device is connected in parallel to the (Continued)

power line, and the output end of the subsidiary power circuit protection device is connected to the electrical device.

3 Claims, 5 Drawing Sheets

(56) References Cited

FOREIGN PATENT DOCUMENTS

| | | |
|---|---|---|
| CN | 110549966 | 12/2019 |
| JP | 2010036646 | 2/2010 |

OTHER PUBLICATIONS

"Written Opinion of the International Searching Authority (Form PCT/ISA/237) of PCT/CN2022/080938", mailed on May 13, 2022, pp. 1-4.

* cited by examiner

POWER DISTRIBUTION SYSTEM

CROSS-REFERENCE TO RELATED APPLICATION

This application is a 371 of international application of PCT application serial no. PCT/CN2022/080938, filed on Mar. 15, 2022, which claims the priority benefit of China application no. 202110356005.8, filed on Apr. 1, 2021. The entirety of each of the above-mentioned patent applications is hereby incorporated by reference herein and made a part of this specification.

TECHNICAL FIELD

The invention relates to the field of automotive power systems, specifically a power distribution system.

DESCRIPTION OF RELATED ART

The usual automotive on-board power system uses an electrical box with a number of relays and fuse wires for power distribution, power logic control and power safety management.

In recent years, vehicle network systems have been used to control multiple electrical devices in vehicles. In a vehicle network system, usually a control unit connected in the network system controls multiple peripheral electrical devices.

Usually, the power lines supplying automobile electrical appliances or control units with a certain power are independently connected to an electrical box, and a suitable fuse wire is connected in series to each power line to protect the safety of the power line. In some cases, a relay is connected in series to a fuse wire in the electrical box to achieve logical control of this power branch.

Figure 1:
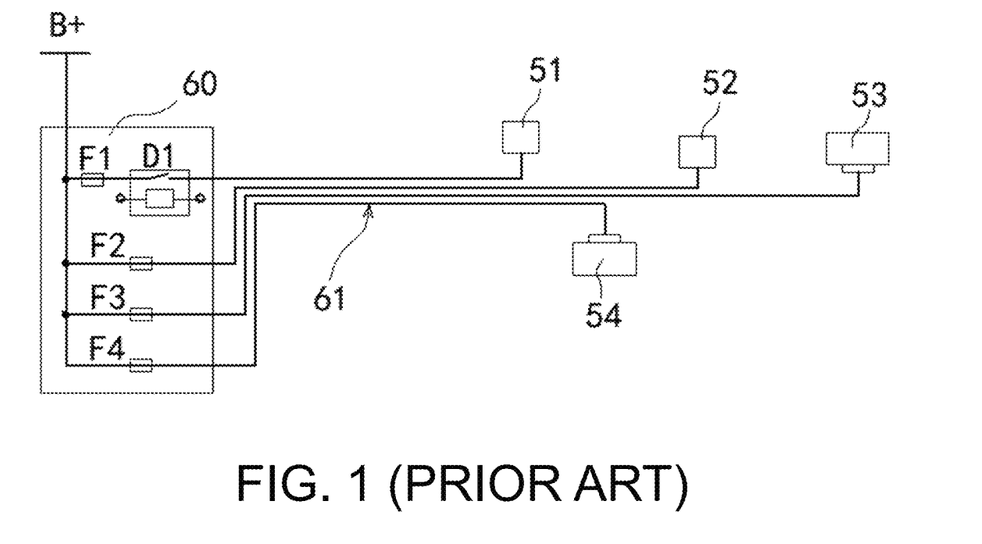
FIG. 1 is a schematic structural diagram of a power distribution system in the prior art.

As shown in FIG. 1, a common power distribution system comprises an electrical box 60 and a plurality of output power lines 61. The power supply system B+ is connected to the electrical box 60 and divided into four branches. These four branches of power are output to the electrical equipments 51, 52 and the control units 53, 54 under the safety protection of the fuse wires F1, F2, F3 and F4, respectively. A relay D1 is connected in series to the power supply connected to the fuse wire F1 to realize the logical control of this power branch.

The shortcomings of the current power distribution method mainly include the following aspects:

(1) Complex structure and high failure rate.

Most power branches implement logic control and safety protection through relays and fuse wires. A separate fuse wire directly protects the connected electrical equipment. When the electrical equipment is abnormal or the power line of this branch has leakage or short circuit, it is very easy to cause the fuse wire to be disconnected. Moreover, relays have mechanical contacts, which have limited reliability and lifespan. Therefore, it is difficult to improve the reliability of the power distribution system with the existing power distribution methods.

In addition, the electrical power of each branch is supplied through an electrical box. When one of the power lines assigned to the electrical box brings interference, this interference can easily be transmitted to other power lines through the electrical box, causing damage or destruction to other electrical devices or electrical control units connected to the other power lines.

(2) At present, automobile electrical systems have more and more functions, the degree of informatization of automobile electrical systems is getting higher and higher, and the breadth of informatization applications is getting wider and wider. This has also brought about an increase in the electrical complexity of automobiles, making traditional electrical systems and traditional power supply methods incompetent.

(3) The traditional power distribution system has low intelligence, which makes it unfavorable for intelligent power management.

(4) The current power distribution architecture does not match the future development of automobile power system requirements.

SUMMARY

The technical problem to be solved by the present invention is to provide a power distribution system, which constructs a two-level power supply protection architecture from the system power supply to the electrical device in a structural form consisting of a main control unit, a subsidiary control unit and a power line. The main control unit constitutes the protection of the power line, and the subsidiary control unit constitutes the protection of itself and connected electrical devices.

The technical solution of the present invention is:

A power distribution system, comprising a system power supply, a main control unit, a power line and a number of subsidiary control units. The main control unit is configured to manage and protect the system power supply, and the main control unit comprises a main controller and a main power circuit protection device connected to the main controller. The input end of the main power circuit protection device is connected to the power output end of the system power supply, and the output end of the main power circuit protection device is connected to an end of the power line. The subsidiary control unit is used to manage and protect the power supply of the subsidiary control unit and the power supply of the external electrical devices of the subsidiary control unit. Each subsidiary control unit includes a subsidiary controller and a subsidiary power circuit protection device connected to the subsidiary controller. The power input end of the subsidiary power circuit protection device is connected in parallel to the power line, and the output end of the subsidiary power circuit protection device is connected to the electrical device.

The system power supply is an accumulator power supply.

The main control unit comprises at least one main power circuit protection device connected to the main controller, wherein the input end of each main power circuit protection device is connected to the power output end of the system power supply, and the output end of each main power circuit protection device serves as the power output end of the main control unit or is connected to the corresponding power line.

The main power circuit protection device and the subsidiary power circuit protection device each adopt any structure of the following four types of circuit protection devices: circuit protection devices consisting only of electronic switch tubes, circuit protection devices consisting only of fuses, circuit protection devices consisting of fuses and electronic switch tubes connected in series, and circuit protection devices consisting of electronic switch tubes and electronic switch tubes connected in series.

The main controller of the main control unit is connected to a network line, and the subsidiary controllers of each subsidiary control unit are connected in parallel to the network line.

The input end of the subsidiary power circuit protection device is connected through a subsidiary power line in parallel to the power line.

The main controller is connected to the main power circuit protection device through the corresponding current converter to realize power output management and protection of the main power circuit protection device. The subsidiary controller is connected to the subsidiary power circuit protection device through a corresponding current converter to realize power output management and protection of the subsidiary power circuit protection device.

INDUSTRIAL APPLICABILITY

The main technical features of the present invention are reflected in the innovation of power supply architecture and control mode, which brings many advantages in performance, structure, installation and cost, which are mainly reflected in the following aspects:

(1) The present invention eliminates the need for the traditional electrical box containing fuse wires and relays. There is no need to lead a power line separately from the electrical box for each electrical appliance and control unit. Only one power line is required to connect the main control unit and the subsidiary control unit. That is, one power transmission can be constructed, and thus the power line configuration can be standardized and the design and production can be simplified.

(2) The amount of copper used in the power lines in the power distribution system of the present invention is reduced, which saves costs and reduces the weight of the vehicle body. The technical content is mainly reflected in the following three aspects:

The factors to be usually considered in the design margin of the power line current carrying capacity are to satisfy the large current and safety factor at the moment when the electrical device is started. When multiple electrical devices are connected to one power line, the required wire diameter of the power line taken together is much smaller than the cumulative wire diameter of the power lines for each electrical device individually. Because when one power line connects multiple electrical devices, the maximum current increment when the electrical device is turned on at a time point is a smaller limit value.

According to the characteristics of automobile electrical appliances, some electrical equipment consumes electricity intermittently (such as wipers and turn signals), while some electrical equipment only consumes electricity within a short period of time (such as horns and brake lights). When the power line is comprehensively designed according to the present invention, the above-mentioned electrical equipment only needs to add a smaller wire diameter to the original designed power line, or even without increasing the wire diameter to meet the requirements.

Some electrical devices that consume very little power, such as sensors and electronic switches, do not need to consider the addition of power lines.

The above three factors make the actual copper consumption of the power line of the present invention smaller than that of the known power distribution scheme.

(3) Using the power distribution system structure of the present invention, the electrical devices connected to the power line can use priority settings for delayed start or intelligent power distribution, so that the impact to the power system is small and the operation is stable.

DESCRIPTION OF THE EMBODIMENTS

The technical solutions in the embodiments of the present invention will be clearly and completely described below with reference to the accompanying drawings in the embodiments of the present invention. Obviously, the described embodiments are only some of the embodiments of the present invention, but not all of the embodiments. Based on the embodiments of the present invention, all other embodiments obtained by those of ordinary skill in the art without creative efforts fall within the scope of protection of the present invention.

Embodiment 1

Figure 2:
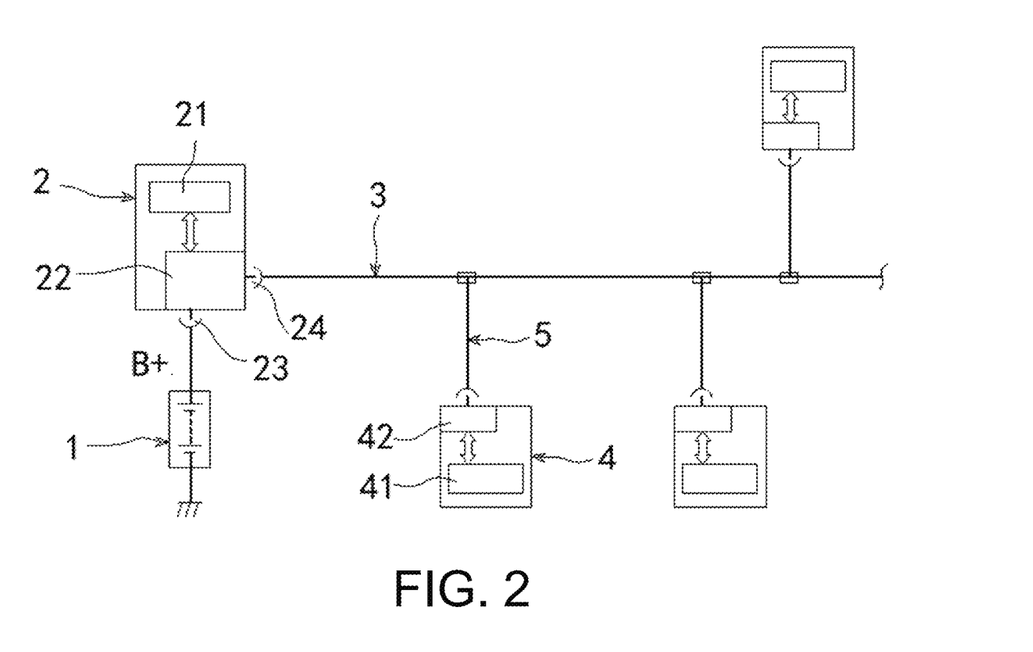
FIG. 2 is a schematic structural diagram of the power distribution system in Embodiment 1 of the present invention.

Referring to FIG. 2, a power distribution system comprises a system power supply 1, a main control unit 2, a power line 3 and a number of subsidiary control units 4. The main control unit 2 is configured to manage and protect the system power supply. The main control unit 2 comprises a main controller 21 and a main power circuit protection device 22 connected to the main controller 21. The input end 23 of the main power circuit protection device 22 is connected to the power output end of the system power supply 1, and the output end 24 of the main power circuit protection device 22 is connected to an end of the power line 3. The subsidiary control unit 4 is configured to manage and protect the power supply of the subsidiary control unit and the power supply of the external electrical devices of the subsidiary control unit. Each subsidiary control unit 4 comprises a subsidiary controller 41 and a subsidiary power circuit protection device 42 connected to the subsidiary controller 41. The input end of the subsidiary power circuit protection device 42 is directly connected in parallel to the power line 3, or is connected through a subsidiary power line 5 in parallel to the power line 3, and the output end of the subsidiary power circuit protection device 42 is connected to the electrical device.

The main power circuit protection device 22 and the subsidiary power circuit protection device 42 each adopt any structure of the following four types of circuit protection devices: circuit protection devices consisting only of electronic switch tubes, circuit protection devices consisting only of fuses (including fast-blow and slow-blow types), circuit protection devices consisting of fuses and electronic switch tubes connected in series, and circuit protection devices consisting of electronic switch tubes and electronic switch tubes connected in series.

Figure 3:
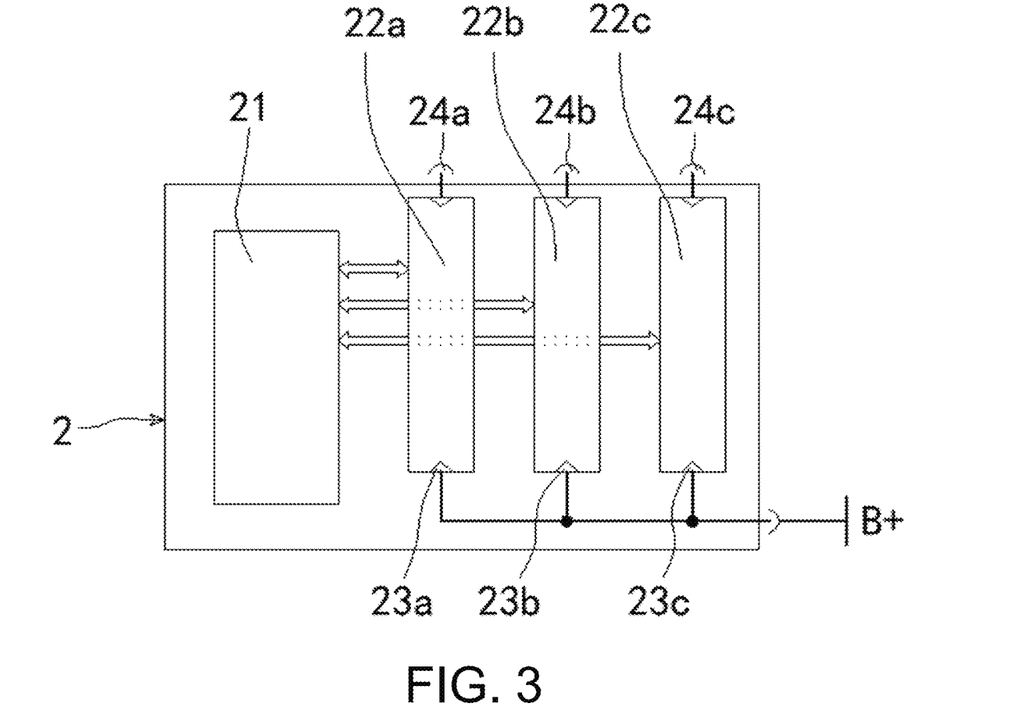
FIG. 3 is a schematic diagram of the principle of a main control unit comprising three main power circuit protection devices of the present invention.

As shown in FIG. 3, the main control unit 2 comprises three main power circuit protection devices 22a, 22b and 22c connected to the main controller 21. The input ends 23a, 23b and 23c of the three main power circuit protection devices are all connected to the power output end B+ of the system power supply 1. The output end 24a, 24b or 24c of each main power circuit protection device serves as a power output end for expansion or is connected to the corresponding power line 3.

Figure 4:
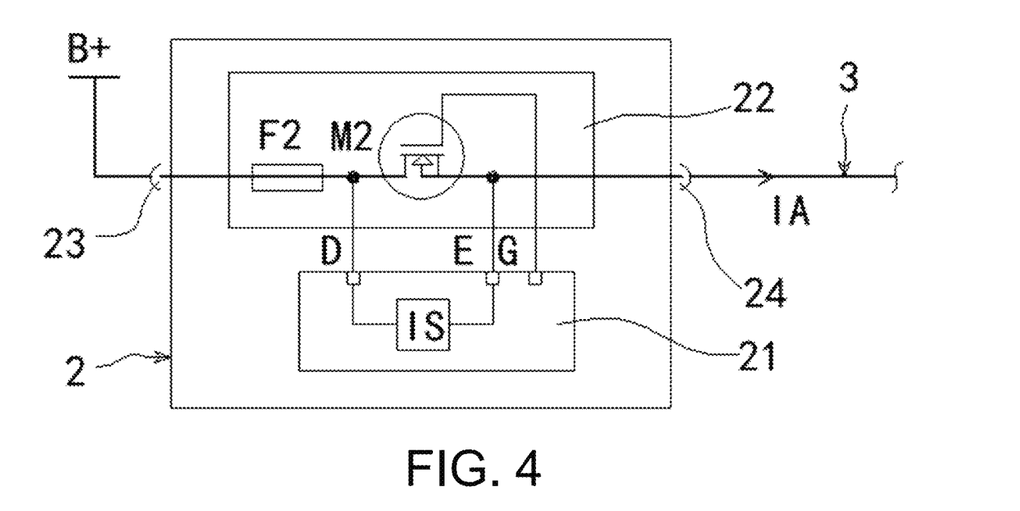
FIG. 4 is a schematic diagram of the principle of the main control unit of the present invention.

As shown in FIG. 4, the main control unit 2 comprises a fuse wire F2, an electronic switch tube M2, a current sensor IS and a main controller 21. The fuse wire F2 and the electronic switch tube M2 are connected in series to form the main power circuit protection device 22. The current sensor IS is formed by the voltage drop formed by the current IA on the power line 3 on the on-resistance RON of the electronic switch tube M2 when it is turned on.

The main controller 21 comprises current signal conditioning, current acquisition and output control functions. The calculation formula of the voltage source formed at the DE input end of the main controller 21 when the electronic switch tube M2 is turned on is as follows:

$VDE=IA*RON$, wherein IA is the current flowing through the power line 3, and RON is the internal on-resistance of the electronic switch tube M2.

This formula can be used to obtain the current value of the electronic switch tube M2 when it is turned on.

A short circuit in the power line 3, leakage or an abnormality in a certain subsidiary control unit 4 will cause the sensing value of the current sensor IS to change. When the operating current detected by the main controller 21 is greater than the set protection threshold current value, the main controller 21 turns off the electronic switch tube M2 through its port G, thereby cutting off the power supply of the power line 3 to protect the power line 3. The function of fuse wire F2 is to enhance the safety of the main power circuit protection device.

Figure 5:
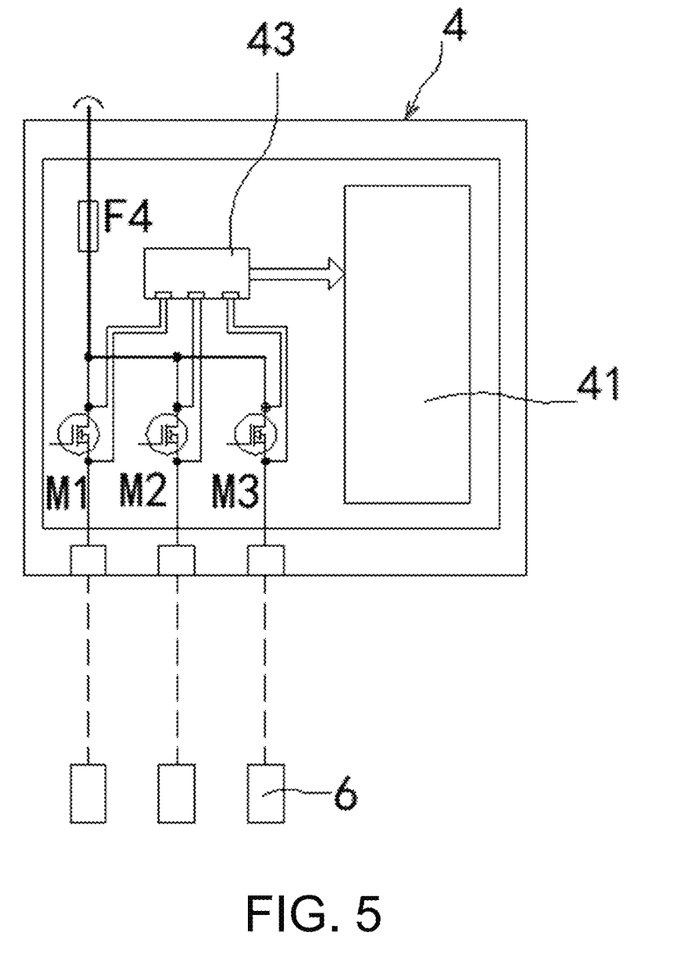
FIG. 5 is a first schematic structural diagram of a subsidiary control unit of the present invention.

As shown in FIG. 5, the subsidiary control unit 4 comprises a fuse wire F4, three MOS electronic switch tubes, a current conversion component 43 and a subsidiary controller 41. The fuse wire F4 is connected in series with three MOS electronic switch tubes to form the subsidiary power circuit protection device 42. The three output ends of the subsidiary power circuit protection device 42 are externally connected with electronic loads or electrical devices 6. The current conversion of the three MOS tubes is realized by the current conversion component 43. The subsidiary controller 41 implements power output management and protection of the three MOS electronic switch tubes M1, M2 and M3 based on the three current values converted by the current conversion component 43.

Figure 6:
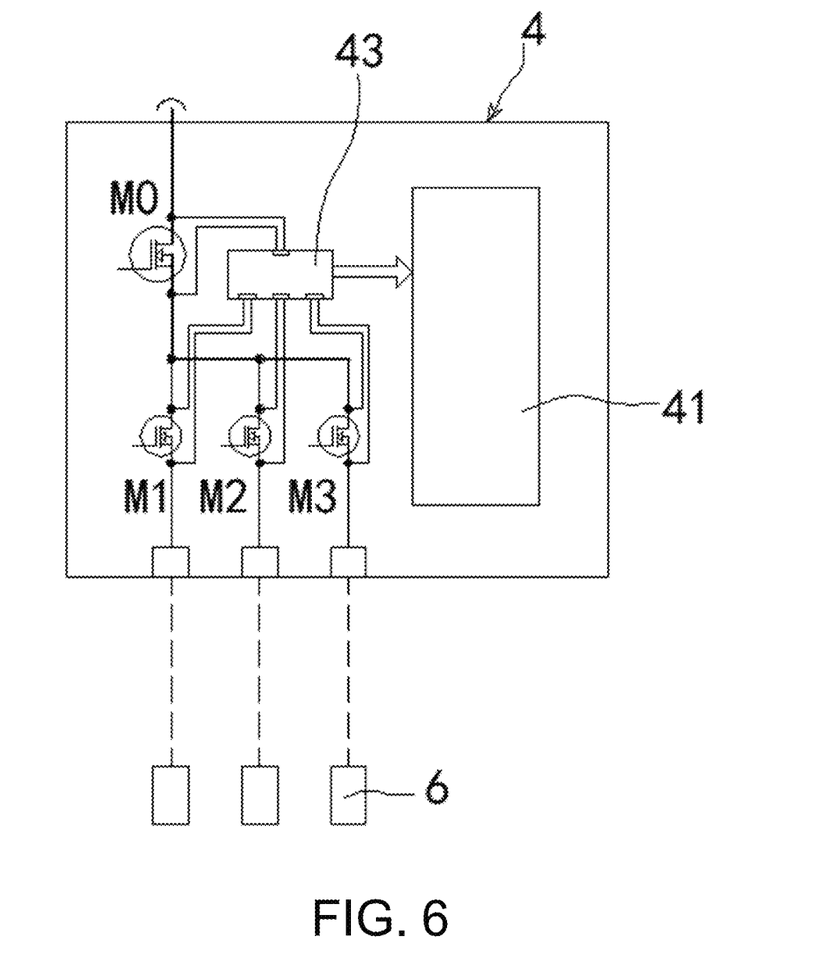
FIG. 6 is a second schematic structural diagram of the subsidiary control unit of the present invention.

As shown in FIG. 6, the subsidiary control unit 4 comprises four MOS electronic switch tubes, a current converter 43 and a subsidiary controller 41. The MOS electronic switch tube M0 is connected in series with four other MOS electronic switch tubes, and the current conversion of the four MOS tubes is realized by the current converter 43. The subsidiary controller 41 implements output power management and protection of the four MOS electronic switch tubes M0, M1, M2 and M3 based on the four current values converted by the current converter 43.

In this embodiment, the MOS switch tubes comprise in the main power circuit protection device 22 and the subsidiary power circuit protection device 42 can be integrated intelligent MOS tubes with better protection performance. The power protection and management functions of the integrated intelligent MOS tubes comprise temperature protection, over-current protection, over-voltage protection and fault diagnosis.

Embodiment 2

Figure 7:
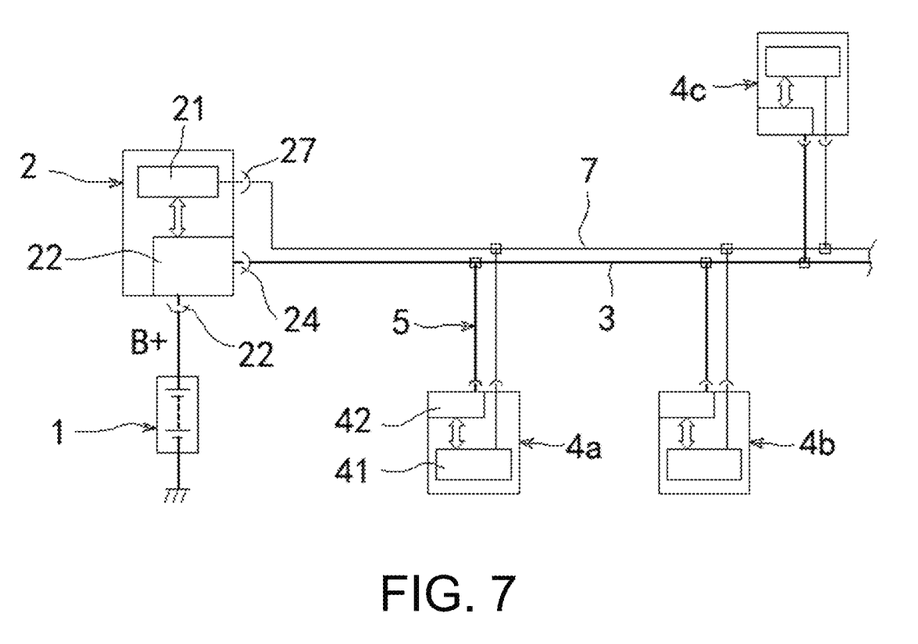
FIG. 7 is a schematic structural diagram of the power distribution system in Embodiment 2 of the present invention.

Referring to FIG. 7, a power distribution system comprises a system power supply 1, a main control unit 2, a power line 3, a network line 7 and a number of subsidiary control units 4a, 4b and 4c. The connection relationship between the system power supply 1, the main control unit 2, the power line 3 and the subsidiary control units 4 is the same as in Embodiment 1. The main controller 21 of the main control unit 2 is connected to a network line 7, and the subsidiary controllers 41 of each subsidiary control unit 4 are connected in parallel to the network line 7. The main control unit 2 realizes optimized power distribution and intelligent power management to each subsidiary control unit 4 through the network line 7.

When a certain electrical device controlled by the subsidiary control units 4a and 4c receives an operation command for executing the same control logic, the main control unit 2 can perform operations on the electrical appliances controlled by the corresponding subsidiary control units 4a and 4c according to the preset priority and delay time, respectively. For example, the subsidiary control unit 4a controls the glass lifting and lowering of the left front door, and the subsidiary control unit 4c controls the glass lifting and lowering of the right front door, and the priority of the subsidiary control unit 4a is higher than the priority of the subsidiary control unit 4c. When a one-key execution of the command to lower the left front door glass and the right front door glass simultaneously is activated, the main control unit 2 first lowers the glass of the left front door, and then starts to lower the glass of the right front door after a time delay. This operation suppresses the maximum value of the current and reduces the diameter of the electric wires, thereby reducing the weight of the control system.

However, the present invention is not limited to the operation of the above-described embodiment. For example, when the left front door glass lift switch and the right front door glass lift switch execute a command lowering glasses at the same time, the main control unit 2 also controls the left front door glass to lower for a certain period of time, and then controls the right front door glass to lower.

Although the embodiments of the present invention have been shown and described, those of ordinary skill in the art will understand that various changes, modifications, substitutions and variants can be made to these embodiments without departing from the principles and spirit of the invention. The scope of the invention is defined by the appended claims and their equivalents.

What is claimed is:

1. A power distribution system, wherein the power distribution system comprises:
a system power supply;
a main control unit, wherein the main control unit is configured to manage and protect the system power supply, and the main control unit comprises a main controller and a main power circuit protection device connected to the main controller; wherein an input end of the main power circuit protection device is connected to a power output end of the system power supply;

a power line, wherein an output end of the main power circuit protection device is connected to an end of the power line; and multiple subsidiary control units, wherein each of the subsidiary control units is configured to manage and protect a power supply of each of the subsidiary control unit and a power supply of external electrical devices of each of the subsidiary control unit, wherein each of the subsidiary control units comprises a subsidiary controller and a subsidiary power circuit protection device connected to the subsidiary controller, wherein a power input end of the subsidiary power circuit protection device is connected in parallel to the power line, and an output end of the subsidiary power circuit protection device is connected to the external electrical devices, wherein both the main power circuit protection device and the subsidiary power circuit protection device adopt one of the following three types of circuit protection devices: circuit protection devices consisting only of fuses, circuit protection devices consisting of fuses and electronic switch tubes connected in series, and circuit protection devices consisting of multiple electronic switch tubes and multiple electronic switch tubes connected in series, wherein the main control unit comprises a fuse wire F2, an electronic switch tube M2, a current sensor IS and a main controller, wherein the fuse wire F2 and the electronic switch tube M2 are connected in series to form the main power circuit protection device, wherein the current sensor IS is formed by a voltage drop formed by a current IA on the power line on the on-resistance RON of the electronic switch tube M2 when it is turned on, wherein a calculation formula of a voltage source formed at a DE input end of the main controller when the electronic switch tube M2 is turned on is as follows:

$$VDE=IA*RON$$

wherein IA is a current flowing through the power line, and RON is an internal on-resistance of the electronic switch tube M2, wherein the calculation formula is used to obtain a current value of the electronic switch tube M2 when it is turned on, wherein a short circuit in the power line, leakage or an abnormality in one of the subsidiary control units causes a sensing value of the current sensor IS to change, when an operating current detected by the main controller is greater than a set protection threshold current value, the main controller turns off the electronic switch tube M2 through its port G, thereby cutting off a power supply of the power line to protect the power line, wherein a function of fuse wire F2 is to enhance the safety of the main power circuit protection device.

2. A power distribution system, wherein the power distribution system comprises:

a system power supply;

a main control unit, wherein the main control unit is configured to manage and protect the system power supply, and the main control unit comprises a main controller and a main power circuit protection device connected to the main controller; wherein an input end of the main power circuit protection device is connected to a power output end of the system power supply;

a power line, wherein an output end of the main power circuit protection device is connected to an end of the power line; and multiple subsidiary control units, wherein each of the subsidiary control units is configured to manage and protect a power supply of each of the subsidiary control unit and a power supply of external electrical devices of each of the subsidiary control unit, wherein each of the subsidiary control units comprises a subsidiary controller and a subsidiary power circuit protection device connected to the subsidiary controller, wherein a power input end of the subsidiary power circuit protection device is connected in parallel to the power line, and an output end of the subsidiary power circuit protection device is connected to the external electrical devices, wherein both the main power circuit protection device and the subsidiary power circuit protection device adopt one of the following three types of circuit protection devices: circuit protection devices consisting only of fuses, circuit protection devices consisting of fuses and electronic switch tubes connected in series, and circuit protection devices consisting of multiple electronic switch tubes and multiple electronic switch tubes connected in series, wherein each of the subsidiary control units comprises a fuse wire F4, three MOS electronic switch tubes M1, M2 and M3, a current conversion component, and a subsidiary controller, wherein the fuse wire F4 is connected in series with the three MOS electronic switch tubes M1, M2 and M3 to form the subsidiary power circuit protection device, wherein three output ends of the subsidiary power circuit protection device are externally connected with electronic loads or electrical devices, wherein a current conversion of the three MOS electronic switch tubes M1, M2 and M3 is realized by the current conversion component, wherein the subsidiary controller implements power output management and protection of the three MOS electronic switch tubes M1, M2 and M3 based on three current values converted by the current conversion component.

3. A power distribution system, wherein the power distribution system comprises:

a system power supply;

a main control unit, wherein the main control unit is configured to manage and protect the system power supply, and the main control unit comprises a main controller and a main power circuit protection device connected to the main controller; wherein an input end of the main power circuit protection device is connected to a power output end of the system power supply;

a power line, wherein an output end of the main power circuit protection device is connected to an end of the power line; and multiple subsidiary control units, wherein each of the subsidiary control units is configured to manage and protect a power supply of each of the subsidiary control unit and a power supply of external electrical devices of each of the subsidiary control unit, wherein each of the subsidiary control units comprises a subsidiary controller and a subsidiary power circuit protection device connected to the subsidiary controller, wherein a power input end of the subsidiary power circuit protection device is connected in parallel to the power line, and an output end of the subsidiary power circuit protection device is connected to the external electrical devices, wherein both the main power circuit protection device and the subsidiary power circuit protection device adopt one of the following three types of circuit protection devices: circuit protection devices consisting only of fuses, circuit protection devices consisting of fuses and electronic switch tubes connected in series, and circuit protection devices consisting of multiple electronic switch tubes and multiple electronic switch tubes connected in series, wherein each of the subsidiary control units comprises four MOS electronic switch tubes M0, M1, M2 and M3, a current converter and a subsidiary controller, wherein the MOS electronic switch tube M0 is connected in series with three other MOS electronic switch tubes M1, M2 and M3, and a current conversion of the four MOS electronic switch tubes M0, M1, M2 and M3 is realized by the current converter, wherein the subsidiary controller implements output power management and protection of the four MOS electronic switch tubes M0, M1, M2 and M3 based on four current values converted by the current converter.

* * * * *